United States Patent [19]

Stolz

[11] 4,444,547
[45] Apr. 24, 1984

[54] AIR PRESSURE OPERATED LUBRICATING GUN

[75] Inventor: Hermann Stolz, Muehlheim am Main, Fed. Rep. of Germany

[73] Assignee: MATO Maschinen-und Metallwarenfabrik Curt Matthaei GmbH & Co. KG, Offenbach, Fed. Rep. of Germany

[21] Appl. No.: 252,393

[22] Filed: Apr. 9, 1981

[30] Foreign Application Priority Data

May 2, 1980 [AT] Austria ............................ A 2359/80

[51] Int. Cl.³ ............................................. F04B 17/00
[52] U.S. Cl. ......................................... 417/46; 91/345; 91/352; 417/403
[58] Field of Search ......................... 417/46, 403, 404; 91/345, 352

[56] References Cited

U.S. PATENT DOCUMENTS

| | | | |
|---|---|---|---|
| 1,943,603 | 1/1934 | Hartman | 91/345 |
| 2,235,544 | 3/1941 | Wold | 417/403 |
| 2,540,939 | 2/1951 | Foster | 417/403 X |
| 2,616,523 | 11/1952 | Davis | 417/46 X |
| 2,765,804 | 10/1956 | Dinkelkamp | 417/46 X |
| 3,151,805 | 10/1964 | Pribonic | 91/345 X |
| 3,244,357 | 4/1966 | Bunker | 91/352 X |
| 3,544,239 | 12/1970 | Graham | 417/403 |

FOREIGN PATENT DOCUMENTS 929954  7/1955  Fed. Rep. of Germany ........ 91/345

*Primary Examiner*—Leonard E. Smith
*Attorney, Agent, or Firm*—W. G. Fasse; D. H. Kane, Jr.

[57] ABSTRACT

An air pressure operated automatic lubricating gun is simplified in its components and in its assembly to such an extent that this automatic gun can compete economically with manually operated lubricating guns. This improvement has been made possible by locating an air pressure chamber in a main pipe above the high pressure pump and below the air pressure operated motor. The riser pipe for the lubricant is arranged off-center to the central longitudinal axis so as not to interfere with the operation of the centrally located pump piston. The riser pipe passes through the air pressure chamber for a compact assembly. The air pressure supply control means are arranged in the air pressure chamber.

10 Claims, 8 Drawing Figures

SECTION I-I in Fig.4

SECTION I-II in Fig. 4

SECTION III-III in Fig. 2

Fig. 4
SECTION IV-IV in Fig. 1
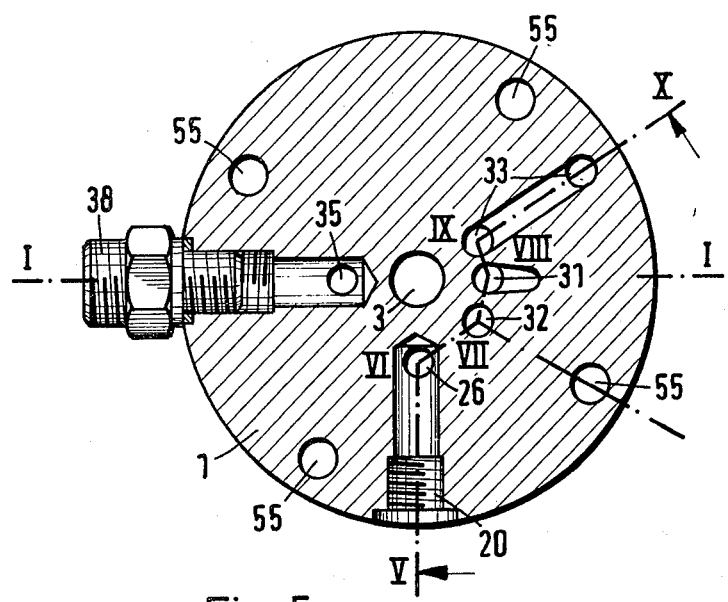
Fig. 5
SECTION V-X in Fig. 4
Fig. 5a
SECTION XV-XV in Fig. 5
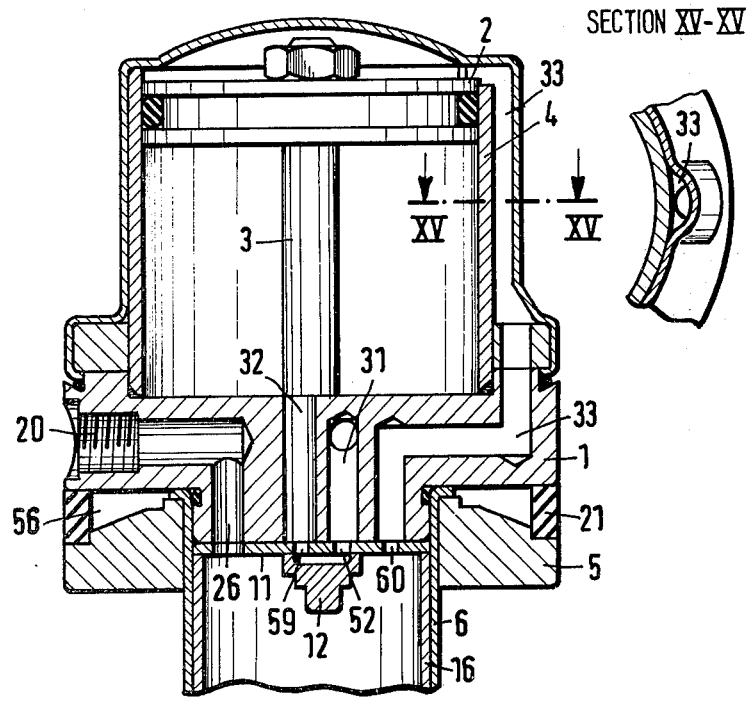

SECTION XI-XII-XIII-XIV in Fig. 3

AIR PRESSURE OPERATED LUBRICATING GUN

CROSS-REFERENCE TO RELATED APPLICATION

The present invention is based on the corresponding Austrian Patent Application No. A 2359/80 filed in Austria on May 2, 1980. The priority of the Austrian filing date is claimed for the present application.

BACKGROUND OF THE INVENTION

The present invention relates to an air pressure operated lubricating gun or apparatus for pumping lubricant out of a container such as a barrel or a drum holding the lubricant. A pneumatically driven barrel pump is the most important tool for manually performing a lubricating job. Such a pump makes it possible to withdraw the lubricant directly from its original container while simultaneously transporting the lubricant at low pressure for a volume conveyance as well as at high pressure for the lubrication proper.

The invention relates to an air pressure operated lubricating pump in which the air pressure motor drives the high pressure pump by means of an intermediate rod. The motor is automatically switched over when it reaches its end position. The high pressure pump conveys the lubricant, especially lubrication grease, directly from the containers into the lubricating conduit.

It is known in connection with such lubricating pumps to locate the control means for the air motor above, next to, or below the drive piston within special structural components such as a housing for these control means. The switch-over is preferably caused by means of a pull rod arranged inside the piston rod of the air motor and effective when the air motor piston reaches its end positions.

The high pressure pump may be arranged in the pipe which is immersed into the lubricant. The lubricant is conveyed through hollow spaces in the immersion pipe to a discharge port above the immersion pipe whereby the hollow spaces are arranged concentrically relative to the conveying piston. Conventionally, the immersion pipe comprises several structural components which are secured to one another by screwed connections in a high pressure sealed manner. The junctions, which cannot be avoided between two adjacent immersion pipe components, hinder the sliding of the follow-up piston on the outside of the immersion pipe which guides the follow-up piston. Thus, it is known to enclose the immersion pipe with a protective pipe which covers the junctions between adjacent immersion pipe components.

Due to the high construction costs of prior art air pressure operated lubricating pumps, they may be used economically only for a relatively small number of lubricating jobs.

OBJECTS OF THE INVENTION

In view of the above, it is the aim of the invention to achieve the following objects singly or in combination:

to construct a lubricating pump of the type described above which may be manufactured at substantially reduced cost due to a novel arrangement of the pump elements;

to construct an automatically pressurized lubricating gun which is sufficiently economical so as to be used instead of conventional hand operated lubricating guns; and to construct the lubricating gun of the type described in such a manner that it may be produced in a number of different sizes for economical use in a wide range of applications.

SUMMARY OF THE INVENTION

According to the invention, there is provided an air pressure operated lubricating apparatus comprising main pipe means with a longitudinal central axis. A high pressure pump with its components is located in the main pipe means which is surrounded by a protective pipe cover member. An air pressure operated motor is operatively connected to the high pressure pump, and an air pressure chamber is located in the main pipe means above the high pressure pump means and below the motor. A lubricant riser pipe is operatively arranged in the main pipe off-center relative to the longitudinal central axis. The air pressure supply control means are located in the main pipe and operatively connected to the air pressure operated motor for automatically reversing the back and forth movement of the piston cylinder means of the air pressure operated motor.

According to the invention, the number of structural components has been reduced in an optimal manner so that the present lubricating gun may be produced in an economical manner. Moreover, the components themselves are simpler than prior art components and, therefore, may be produced and assembled in an economical manner.

Another important advantage of the lubricating gun according to the invention is seen in its versatile applicability even to uses other than lubricating, for example, the present apparatus may be used as a drive means for hydraulically operated tools. Such hydraulically operated tools require relatively small volumes to be conveyed but they are operated by high pressure. The present lubricating pump, due to its low cost, may be used economically even for the driving of such hydraulically operated tools. Thus, the present apparatus may be used to convert an available air pressure into the required hydraulic pressure for operating hydraulically driven tools, especially hand tools such as are used in automated repair shops and the like.

BRIEF FIGURE DESCRIPTION

In order that the invention may be clearly understood, it will now be described, by way of example, with reference to the accompanying drawings, wherein:

FIG. 4 is a horizontal section through the head piece of the pump along section line IV—IV in FIG. 1;

FIG. 5 is a vertical section through the air pressure operated motor portion and head piece along section line V—X in FIG. 4;

FIG. 5a is a section along section line XV—XV in FIG. 5;

Figure 1:
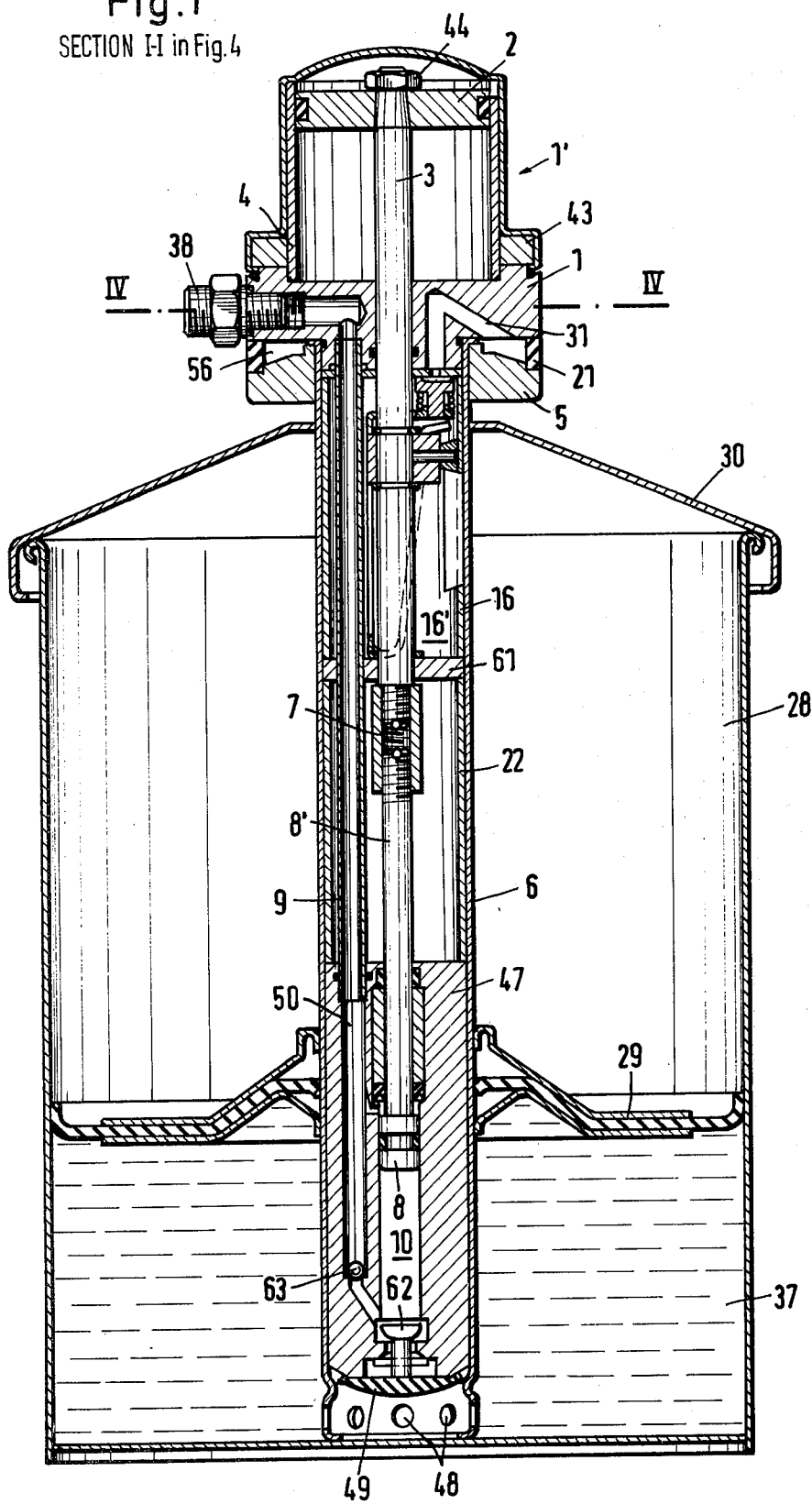
FIG. 1 is a vertical section through a lubricating pump and drive motor according to the invention inserted into a lubricant container whereby the section extends along section line I—I in FIG. 4.

DETAILED DESCRIPTION OF PREFERRED EXAMPLE EMBODIMENTS AND OF THE BEST MODE OF THE INVENTION:

FIG. 1 shows the lubricating pump according to the invention inserted into a lubricant container 28 closed by a protective cover 30 and still filled to some extent with lubricant 37. The main pipe means 16, 22 and the pump housing 47 are enclosed by a cover pipe 6 which is inserted into the container 28 through an opening in the cover 30. The follow-up piston 29 is able to slide up and down along the outer surface of the cover pipe 6. The lower end of the cover pipe 6 is provided with lubricant entrance holes 48. Additionally, a screen 49 may be located as shown for screening out contaminants in the lubricant before it enters into the riser pipe 9.

The pump housing 47, the pipe section 22 operating as a spacer sleeve, and the tubular insert 16 have a common longitudinal, central axis and are encased by the protective cover pipe 6. The pump housing 47 defines at its lower end a high pressure cylinder 10 arranged concentrically relative to said longitudinal, central axis. The pump housing 47 further comprises a bore 50 located off-center relative to said central axis for conveying lubricant from the container 28 through the bore 50 into the riser pipe 9 which is operatively connected to the pump housing 47 for cooperation with the bore 50 in a sealed manner, for example by a threaded connection. The upper end of the off-center located riser pipe 9 is connected in a sealed manner to a head piece 1, for example, also by a threaded, or plug-in sealed connection. The head piece 1 is located above the container cover 30 and forms the base for the air pressure operated motor means 1' comprising a cylinder 4, a piston 2 movable up and down in the cylinder 4 and connected to a piston rod 3, for example, by a nut 44 secured to the upper threaded end of the piston rod 3.

A high pressure pump piston 8 secured to the lower end of its piston rod 8' is located in the cylinder 10 of the pump housing 47. A threaded sleeve or nut 7 connects the upper end of the pump piston rod 8' to the lower end of the piston rod 3 of the air motor. The lower end of the piston rod 3 is guided by a guide disk 61 which is stationary between the tubular insert 16 and the spacer sleeve 22 which keeps the guide disk 61 at a predetermined spacing from the pump housing 47. The insert 16 spaces the disk 61 from the head piece 1 and provides a high pressure chamber 16' as will be described in more detail below.

Figure 2:
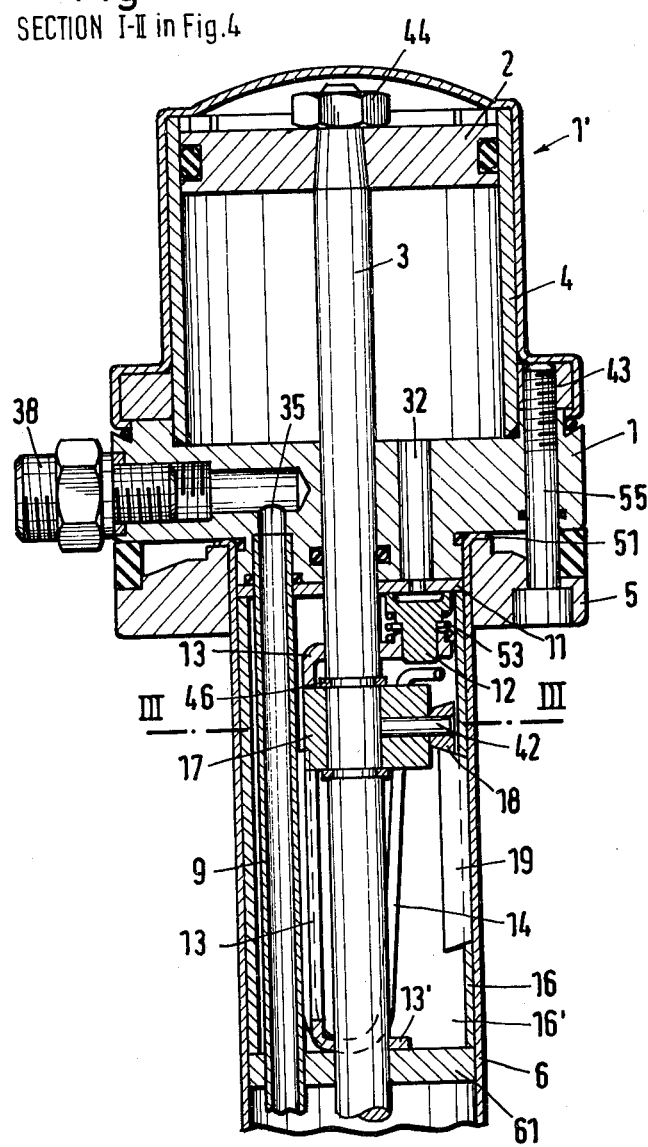
FIG. 2 is a sectional view similar to that of FIG. 1; however, the sectional plane extends along section line I—II in FIG. 4.

As best seen in FIG. 2, the upper end of the cover pipe 6 comprises a flange 51 which is held against a shoulder of the head piece 1 by means of a clamping ring 5 held in position, for example, by four threaded bolts 55 reaching through the head piece 1 and into respective threaded holes in a mounting flange 43 operatively secured to the air motor 1'. Thus, the entire structure may be easily assembled and disassembled by simply actuating the four threaded bolts 55 which may be provided with a hexagonal socket for the insertion of a tool in the head end of these bolts 55.

As shown in FIG. 1, the head piece 1 comprises an air exit bore 31 which cooperates with a hole 52 in a control plate 11 as best seen in FIG. 5. The air exit bore 31 makes a sharp bend as best seen in FIG. 1 to merge into an air exit space 56 connected to the atmosphere through a noise damping ring 21, for example, of air permeable foam material.

FIG. 1 shows the compact and yet robust construction of the grease gun or lubricating press according to the invention in which all sensitive parts or components located outside the grease gun have been eliminated. Further, by arranging the riser pipe 9 nonsymmetrically relative to the central longitudinal axis, the invention obviates thick-walled pipes and the expensive pressure sealed screw connection which are necessary in lubricating presses of the prior art. According to the invention, the riser pipe 9 can be a pipe of relatively thin wall thickness because the riser pipe 9 is installed in a fixed, permanent position in which it is held at both ends. Additionally, the guide disk 61 operatively supports the riser pipe 9 approximately intermediate its ends. Thus, the type of pipe that may be used for the riser pipe 9 corresponds to pipes used for permanently installed lubricating conduits. Thus, it is possible, according to the invention, to even obviate the above screwed connections and to merely insert the ends of the riser pipe 9 into respective holes of the pump housing 47 and the head piece 1. A simple O-ring may be inserted in the respective hole as shown in FIG. 1. Another advantage of the off-center locating of the riser pipe 9 is seen in that it provides space for the installation of a simple air supply and motor control means in the air pressure chamber 16'.

According to the invention, the plane of the air supply control plate 11 is located at a right angle to the longitudinal axis of the piston rod 3 and thus the plate 11 extends in parallel to the surfaces of the piston 2 in the cylinder 4 of the air motor 1'. This feature has the advantage that the axial thickness of the head piece 1 may be minimized, which in turn has the advantage that the length of the air passages may be minimized, thereby also achieving advantageous switching times for the pressurized air flow.

Figure 3:
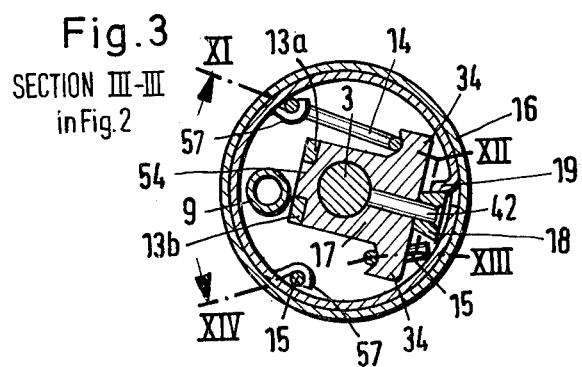
FIG. 3 is a horizontal sectional view along section lines III—III in FIG. 2.

The control of the slide valve member 12 in its position relative to the control plate 11 will now be described primarily with reference to FIGS. 2 and 3. The control plate 11 with its apertures is held in position between the upper end of the insert 16 and a downwardly reaching neck of the head piece 1. The slide member 12 is held in position by a tilting lever 13 which has a foot 13' resting on the guide disk 61 and two guide legs 13a, 13b. A spring 53 is operatively inserted between a shoulder of the slide member 12 and the upper end of the tilting lever 13 to urge the slide member 12 against the plate 11. The lever 13 is able to perform an angular movement about the central axis of the piston rod 3 but it may not perform an axial movement. The shifting lever 17 on the other hand is rigidly secured to the piston rod 3, for example, by clamping rings 46 and, thus, performs an axial up and down movement together with the piston rod 3. The shifting lever 17 has a guide extension 54 which is received between the legs 13a and 13b of the tilting lever 13 as best seen in FIG. 3. The lever 17 may also perform an angular movement about the central, longitudinal axis. This angular movement of the lever 17 is transmitted through the lever 13 to the slide member 12. For controlling the angular movement of the lever 17, a guide roller 18 is rotatably secured to the lever 17, for example, by a journal pin 42. The guide roller 18 travels along a guide tongue 14 as will be described in more detail below with reference to FIG. 7.

Figure 7:
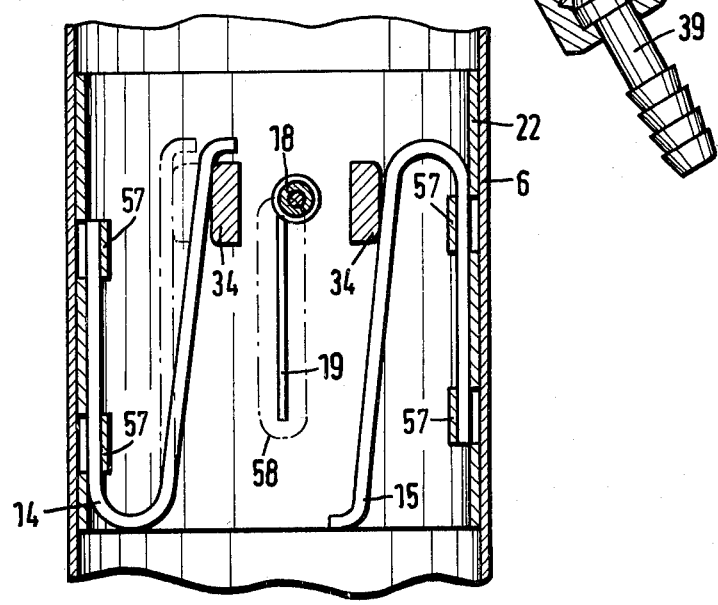
FIG. 7 is a sectional view along section lines XI, XII, XIII, XIV in FIG. 3.

Two U-shaped springs 14 and 15 are arranged inside the tubular insert 16 in positions opposite each other as best seen in FIG. 7. Due to the up and down movement of the shifting lever 17 along with the piston rod 3, the springs 14 and 15 are alternately cocked by the switching or shifting cams 34 forming part of the shifting lever 17 as best seen in FIG. 3. Thus, when the shifting lever 17 reaches its upper or lower end position corresponding to the upper and lower end position of the air pressure operated piston 2, the shifting roller 18 is switched over from contact with one side of the tongue 19 to contacting the other side of the tongue 19, thereby rotating around the upper or lower end of the guide tongue 19. This type of control results in an especially precise shifting which in turn has the advantage that the dead space in the air pressure cylinder 4 of the air motor 1' may be minimized. The formation of the guide tongue 19 is very simple because it may be produced by a simple stamping operation directly out of the pipe insert 16. One leg of each of the U-shaped springs 14 and 15 is held in position inside the pipe insert 16 by lugs 57 also punched out of the pipe insert 16. The dashed dotted line 58 shown in FIG. 7 illustrates the travel path along which the center of the roller 18 travels as the roller 18 is guided along the guide tongue 19.

FIGS. 4 and 5 illustrate the arrangement of all necessary bores in the head piece 1. Air under pressure from a source not shown is supplied into the chamber 16' defined by the pipe insert 16, through the air inlet port 20 and through the bore 26. The guide plate 61 closes the air chamber 16' at the lower end. The control plate 11 forms the top of the air chamber which is also enclosed by the cover pipe 6. Depending on the position of the slide member 12, the air under pressure in the space surrounded by the insert 16 travels into the space above the piston 2 in the cylinder 4 through the air ducts 33. This position of the slide 12 is shown in FIG. 5, whereby any air in the space below the piston 2 in the cylinder 4 may escape through the air duct 32 through the holes 59 and 52 in the plate 11 and through the air duct 31. The reverse applies when the slide member 12 shifts to the right as shown in FIG. 2, whereby air under pressure passes through the hole 59 and the duct 32 into the space below the piston 2 in the cylinder 4 while any air above the piston 2 may escape through the duct 33, the holes 60 and 52 in the plate 11, and through the duct 31 to the atmosphere. Thus, the piston 2 is moved up and down in the cylinder 4 in response to the alternate shifting of the slide member 12 as described. In both instances, the escaping air will pass through the space 56 between the clamping ring 5 and the head piece 1. The noise damping ring 21 is also effective in both instances. Since the ring 21 is arranged all around the clamping ring 5, an especially large exit surface for the pressurized air is provided so that the air pressure motor 1' runs very quietly.

The air motor, according to the invention, is controlled as follows. The guide roller 18 travels along the guide tongue 19 in response to the up and down movement of the air piston 2. The shifting lever 17 is provided with the above mentioned switch-over cams 34 which cock the springs 14 and 15 during the piston movement. The cocked position of the spring 14 is shown by dashed-dotted lines in FIG. 7. When the roller 18 reaches the lowermost position, the spring 15 will be in the cocked position. Since the spring urges the roller 18 against the guide tongue 19, the spring force can cause the shifting of the slide member 12 only at the upper or lower end of the guide tongue 19. The position of the shifting roller or guide roller 18 shown in FIG. 7 corresponds to the position immediately after the switch-over when the air pressure piston 2 begins its downward movement to thereby cock the spring 15.

Each time when the guide roller 18 negotiates around an end of the guide tongue 19, the slide member 12 is shifted by the tilting lever 13 from one end position into the other end position into the other end position by an angular movement in a plane extending perpendicularly to the longitudinal, central axis of the apparatus so that the air passages 32 or 33 are alternately connected to the air pressure supply in the chamber 16' defined by the insert 16 or to the air exit passage 31.

As the piston 8 moves down in the cylinder 10, the quantity of lubricant is pushed out through the bore 50 and the riser pipe 9 to the exit port 38 because the valve 62 closes in response to the downward movement of the piston 8. On the upward suction stroke of the piston 8, the valve 62 opens. A further nonreturn valve 63 may be positioned in the bore 50.

Figure 6:
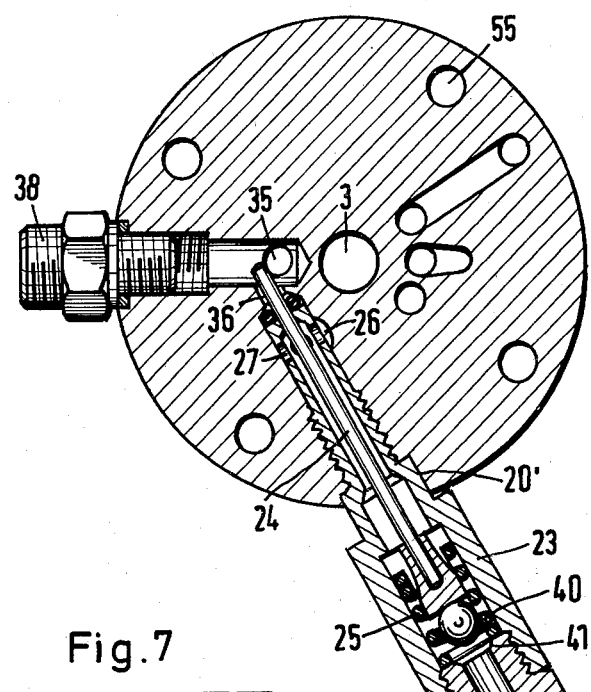
FIG. 6 is an illustration similar to that of FIG. 4 but showing a modified embodiment for the pressurized air inlet means.

FIG. 6 shows a modification of the air inlet 20' which is provided with an air pressure limiting valve 23 connected to the air inlet port 20' at one end thereof, and to a source of air under pressure with its inlet nipple 39. The air pressure limiting valve 23 as such is known in the art. However, in the prior art a connection to the pressure limiting valve was provided outside the pump body. According to FIG. 6, the longitudinal axis of the air inlet port 20' is so located that an actuating pin 24 reaches through a bore 36 into the lubricant passage 35 leading toward the exit port 38. The passage 36 is sealed, for example, by an O-ring around the actuating pin 24. However, the pin 24 responds to the lubricant pressure in the lubricant exit passage 35. The pin 24 is biased by a spring 25 which thus determines the maximum lubricant pressure. When the lubricant pressure exceeds this biasing force of the spring 25, the pin 24 will move the ball valve 40 against its valve seat 41 thereby closing off the pressurized air supply. The arrangement is such that when the valve 40, 41 is open, the air supply can pass through the lateral openings 27 in the valve housing into the air inlet passage 26 as best seen in FIG. 6. The passage 26 leads into the chamber 16' defined by the insert 16.

As mentioned above, all of the components of the present lubricating apparatus are of very simple construction. Thus, the protective cover pipe 6 may, for example, be so constructed that it is somewhat shorter than the elements housed in the pipe 6, namely the pump housing 47, the spacer sleeve 22, and the tubular insert 16. This makes possible to clamp all the components against each other when the pipe 6 with its flanges 51 is clamped against the head piece 1 with the clamping ring 5 and the threaded bolts 55 whereby a proper cooperation of all the components in the high pressure portion of the apparatus is assured. The same effect may be achieved by making the pipe 6 slightly longer than is necessary for the elements 47, 22, and 16 and providing the head piece 1 with a shoulder which reaches into the pipe 6 for the just described clamping of the components held in the pipe 6.

It is an advantage that the entire press may be assembled by merely four threaded bolts which may be of standard construction thereby obviating the manufacturing of large diameter threadings, for example, if the ring 5 would have to be threaded onto the head piece 1 which has been obviated according to the invention.

Although the invention has been described with reference to specific example embodiments, it will be appreciated, that it is intended, to cover all modifications and equivalents within the scope of the appended claims.

What is claimed is:

1. An air pressure operated lubricating apparatus comprising housing means, main pipe means (6, 16, 22) having a longitudinal central axis in said housing means, high pressure pump means (8, 10) operatively held in said main pipe means, air pressure operated motor means (1') including a piston (2) and a piston rod (3) operatively connected to said high pressure pump means (8, 10), air pressure chamber means (16') located in said main pipe means above said high pressure pump means, lubricant riser pipe means (9) operatively arranged also in said main pipe means off-center relative to said longitudinal central axis, and air pressure supply control means (11 to 19, 34) including slide valve means (12) located in said air pressure chamber means (16') inside said main pipe means (6) and operatively connected to said air pressure operated motor means (1', 2, 3) for automatically reversing the back and forth movement of said air pressure operated motor means, said apparatus further comprising a head piece (1), said air pressure motor means (1') being mounted on said head piece (1) on one side thereof so that said piston rod extends centrally through said head piece, said head piece having an inlet port (20) for pressurized air and a lubricant outlet port (38) for discharging lubricant, said riser pipe means being connected to said lubricant outlet port (38) in said head piece (1), said head piece (1) further having air duct means (26, 31, 33) operatively connecting said inlet port (20) to said air pressure chamber means (16'), said slide valve means (12) being arranged in said air pressure chamber means (16') for cooperation with said air duct means in said head piece for controlling the operation of said air pressure operated motor means (1'), whereby the length of said air duct means is short and the slide valve means assure a precise motor control, said apparatus further comprising actuating lever means (13, 17) for said slide valve means (12), said actuating lever means including guide roller means (18), said air pressure supply control means further comprising guide tongue means (19) operatively positioned in said main pipe means, and spring means (14, 15) operatively arranged in said main pipe means for urging said guide roller means (18) against said guide tongue means (19) whereby the shifting of said slide valve means (12) takes place in response to said back and forth movement of said air pressure motor means each time when said guide roller means (18) passes around an end of said guide tongue means.

2. The lubricating apparatus of claim 1, wherein said piston rod of said air pressure operated motor means extends substantially coaxially to said longitudinal central axis.

3. The lubricating apparatus of claim 1, wherein said air pressure supply control means comprise an air supply control plate (11) with air passages (52, 59, 60) therein, said air supply control plate being operatively arranged between said head piece (1) and said slide valve means (12) for sequentially opening and closing said air passages cooperating with said air ducts, and wherein said slide valve actuating lever means (13, 17) are journaled to said piston rod and operatively connected to said slide valve means (12) for tilting the slide valve means (12) back and forth in a rotational movement about said central axis and in sliding contact with said air supply control plate (11).

4. The lubricating apparatus of claim 1, wherein said head piece (1) comprises air inlet passage means (20') extending from said air inlet port and lubricant discharge passage means connecting said riser pipe means to said lubricant discharge port, a bore (36) interconnecting said air and lubricant passage means, and control piston means (24) passing in a sealed manner through said bore for performing a control function in response to the lubricant pressure in said lubricant discharge passage.

5. The lubricating apparatus of claim 4, further comprising air pressure inlet valve means (23) operatively arranged in said air inlet passage means, said control piston means being operatively arranged for cooperation with said air pressure inlet valve means for limiting the air inlet pressure.

6. An air pressure operated lubricating apparatus comprising housing means, main pipe means (6, 16, 22) having a longitudinal central axis in said housing means, high pressure pump means (8, 10) operatively held in said main pipe means, air pressure operated motor means (1') including a piston (2) and a piston rod (3) operatively connected to said high pressure pump means (8, 10), air pressure chamber means (16') located in said main pipe means above said high pressure pump means, lubricant riser pipe means (9) operatively arranged also in said main pipe means off-center relative to said longitudinal central axis, and air pressure supply control means (11 to 19, 34) including slide valve means (12) located in said air pressure chamber means (16') inside said main pipe means (6) and operatively connected to said air pressure operated motor means (1', 2, 3) for automatically reversing the back and forth movement of said air pressure operated motor means, said apparatus further comprising a head piece (1), said air pressure motor means (1') being mounted on said head piece (1) on one side thereof so that said piston rod extends centrally through said head piece, said head piece having an inlet port (20) for pressurized air and a lubricant outlet port (38) for discharging lubricant, said riser pipe means being connected to said lubricant outlet port (38) in said head piece (1), said head piece (1) further having air duct means (26, 31, 33) operatively connecting said inlet port (20) to said air pressure chamber means (16'), said slide valve means (12) being arranged in said air pressure chamber means (16') for cooperation with said air duct means in said head piece for controlling the operation of said air pressure operated motor means (1'), whereby the length of said air duct means is short and the slide valve means assure a precise motor control, said apparatus further comprising actuating lever means (13, 17) for said slide valve means (12), said actuating lever means including a first lever member (13) which is axially stationary relative to said longituindal central axis but which is rotatable back and forth through a defined angular range about said longitudinal central axis, said first lever member having two substantially parallel guide legs, and a second lever member 17 rigidly connected to said air pressure operated motor means (2) for axial back and forth movement with said air pressure operated motor means, said second lever member having a sliding extension operatively received between said parallel guide legs for rotating said slide valve means (12) in response to said axial movement.

7. The lubricating device of claim 1, further comprising a clamping ring (5) arranged below said head piece (1) and forming with the head piece a used air discharge space (56), and a noise damping ring (21) enclosing said space (56) for discharging used air through said head piece and through said space (56) into the atmosphere with a reduced noise level.

8. The lubricating device of claim 6, further comprising a clamping ring (5) arranged below said head piece (1) and forming with the head piece a used air discharge space (56), and a noise damping ring (21) enclosing said space (56) for discharging used air through said head piece and through said space (56) into the atmosphere with a reduced noise level.

9. The lubricating device of claim 6, wherein said head piece (1) comprises air inlet passage means (20') extending from said air inlet port and lubricant discharge passage means connecting said riser pipe means to said lubricant discharge port, a bore (36) interconnecting said air and lubricant passage means, and control piston means (24) passing in a sealed manner through said bore for performing a control function in response to the lubricant pressure in said lubricant discharge passage.

10. The lubricating apparatus of claim 9, further comprising air pressure inlet valve means (23) operatively arranged in said air inlet passage means, said control piston means being operatively arranged for cooperation with said air pressure inlet valve means for limiting the air inlet pressure.

* * * * *